United States Patent Office 2,799,674
Patented July 16, 1957

2,799,674
ORGANIC MERCURY COMPOUNDS OF XANTHINES AND PROCESS OF MAKING SAME

Walther Persch, Frankfurt am Main Hochst, and Rolf-Eberhard Nitz, Frankfurt am Main Fechenheim, Germany, assignors to Cassella Farbwerke Mainkur Aktiengesellschaft, Frankfurt, Germany, a company of Germany No Drawing. Application February 16, 1954,
Serial No. 410,739

Claims priority, application Germany February 19, 1953

4 Claims. (Cl. 260—242)

This invention relates to new organic mercury compounds and to a process of making same.

U. S. Patent 2,576,855 describes a process for preparing organic mercury compounds, which comprises mixing a water-soluble, acidic addition product of mercuric acetate and a xanthine derivative containing an unsaturated lower alkyl group in one of the 1-, 3- and 7-positions, with a xanthine derivative containing a dialkylaminoalkyl group in one of the 1-, 3- and 7-positions in the presence of water.

We have now found that similar compounds are obtained when using in place of the xanthine derivatives containing basic substituents as described by the aforesaid patent, other amines. Especially useful for this purpose are aliphatic amines which may contain another amino group or a hydroxy group, such as ethylene diamine, diethanol amine, diethylaminoethanol. It is preferable to use together with these amines an addition of such amines which further contain a carboxylic group. As amines of this latter kind may be considered: aminoacetic acid, methylaminoacetic acid or its anhydride, nitrilotriacetic acid, ethylenediamine-tetracetic acid, glutamic acid or their sodium salts. The compounds thus obtained show, as compared to those of the aforesaid patent, the advantage of an especially good compatibility. The solutions of these compounds are of pH-values 7.2 to 7.5, which furthermore may be easily adjusted to give isotonic solutions.

The following examples illustrate how the invention may be practiced, but they are not intended to limit the invention of the details set forth therein, the parts being by weight.

Example 1

5 parts of the addition compound of mercury acetate and 1-allyl-3,7-dimethylxanthine (=1-allyl-theobromine) are dissolved with 0.5 part of ethylene diamine (77%) and 3.5 parts of glycine in 100 parts of water. This solution with a pH-value of 7.3 exhibits the properties indicated above.

If using (instead of 3.5 parts of glycine) 3 parts of the tetrasodium salt of the ethylenediamine-tetracetic acid and (instead of 0.5 part) 0.1 part of ethylene diamine (77%), there is likewise obtained a solution with the favorable properties indicated above.

Example 2

5 parts of the hydroxy-mercuric addition compound, which is obtained by shaking in water the addition compound of mercury acetate and 1-allyl-theobromine as used in Example 1, is dissolved with 0.4 part of ethylene diamine and 3.0 parts of glycine in 100 parts of water. This solution shows a pH-value of about 7.3, which is favorable with respect to the tissue-physiological conditions. It can be used for therapeutical purposes as a stable solution for injections of a good compatibility.

If replacing in these examples the glycine by 4 parts of sarcosinic acid anhydride or by 4 parts of the monosodium salt of glutamic acid, products of similar properties are obtained.

We claim:
1. Process for preparing organic mercury compounds, which comprises mixing a water-soluble, acidic addition product of mercuric acetate and a xanthine derivative containing an unsaturated lower alkyl group in one of the 1-, 3- and 7-positions, with an aliphatic amine of the formula

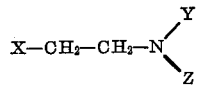

wherein X means a radical of the group consisting of OH and NH₂; Y means a radical of the group consisting of hydrogen and ethyl; Z means a radical of the group consisting of hydrogen, ethyl and hydroxyethyl in the presence of an aliphatic aminocarboxylic acid of the formula

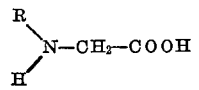

wherein R means a radical of the group consisting of hydrogen and methyl and of water.

2. Process for preparing an organic mercury compound, which comprises mixing the water-soluble, acidic addition product of mercury acetate and 1-allyl-3,7-dimethylxanthine with ethylene diamine in the presence of glycine and of water.

3. The water-soluble, substantially neutral organic mercury compounds obtained by the process of claim 1.

4. The water-soluble, substantially neutral organic mercury compounds obtained by the process of claim 2.

References Cited in the file of this patent
UNITED STATES PATENTS
2,576,855    Persch _____ Nov. 27, 1951